United States Patent [19]

Naito

[11] Patent Number: 4,935,618
[45] Date of Patent: Jun. 19, 1990

[54] WIDE BANDWIDTH PHOTOELECTRIC CONVERTING CIRCUIT

[75] Inventor: Ryuichi Naito, Tokorozawa, Japan

[73] Assignee: Pioneer Electronic Corporation, Tokyo, Japan

[21] Appl. No.: 234,548

[22] Filed: Aug. 22, 1988

[30] Foreign Application Priority Data

Mar. 30, 1988 [JP] Japan .................. 63-42238[U]

[51] Int. Cl.$^5$ ............................. H01J 40/14
[52] U.S. Cl. ................... 250/214 R; 307/311; 136/293
[58] Field of Search ....... 250/214 R, 214 C, 208-209; 307/311; 136/293

[56] References Cited

U.S. PATENT DOCUMENTS

| | | | |
|---|---|---|---|
| 3,872,329 | 3/1975 | Dodson, III | 250/214 R |
| 4,118,621 | 10/1978 | Monticelli et al. | 250/214 C |
| 4,740,686 | 4/1988 | Nusser | 250/214 R |
| 4,745,275 | 5/1988 | Osafune | 250/214 R |
| 4,793,000 | 12/1988 | Imano et al. | 250/214 R |
| 4,797,546 | 1/1989 | Berger et al. | 250/214 R |
| 4,806,748 | 2/1989 | Takami et al. | 250/214 R |
| 4,808,809 | 2/1989 | Hayakawa | 250/214 R |

Primary Examiner—David C. Nelms
Assistant Examiner—Stephone B. Allen
Attorney, Agent, or Firm—Fleit, Jacobson, Cohn, Price, Holman & Stern

[57] ABSTRACT

A photoelectric converting circuit including a light-receiving element which produces a current signal corresponding to the amount of light incident upon it and a current-to-voltage converting circuit which converts the current signal to a voltage signal. The circuit is characterized in that the current signal is supplied to the current-to-voltage converting circuit through an active circuit which exhibits a low input impedance. In preferred embodiments, the active circuit is a common-base transistor circuit in which an emitter current is supplied to the light-receiving element and a collector voltage is outputted as an output signal.

5 Claims, 2 Drawing Sheets

WIDE BANDWIDTH PHOTOELECTRIC CONVERTING CIRCUIT

BACKGROUND OF THE INVENTION

1. Field of the Invention

The present invention relates to a photoelectric converting circuit for use in a pickup of an optical recording and reproducing system or for use in a photo sensor provided in various devices such as a tachometer.

2. Description of Background Information

In optical information recording and reproducing systems such as a magneto-optical disc recording system, a light beam is irradiated on an information signal recording track by means of an optical pickup, and a reflected light or a transmitted light thereof is converted to an electric signal, thereby reading an information signal.

An example of such photoelectric converting circuit will be explained with reference to FIG. 1. This figure illustrates an example of the construction of photoelectric converting circuit used in an optical pickup of an optical disc system (not shown). As shown, a light-receiving element 1 made up of a PIN-photo diode and a load resistance $R_1$ are connected in series with each other, and inserted into a bias power source $+B_1$. The light-receiving elements 1 is reversely biased through the load resistance $R_1$, and produces a current responsive to the amount of a light incident upon a light receiving window (not shown) thereof. The light beam is modulated by a signal recorded on the disc, and converted to a radio frequency (referred to as RF hereinafter) current signal by means of the photo receiving element 1. The RF current signal causes a voltage drop which is proportional to the current level thereof across the resistance $R_1$. A node between the resistance $R_1$ and the light-receiving element 1 constitutes an output terminal of the photoelectric converting circuit. An output voltage signal appearing at this output terminal is amplified in level by an RF amplifying circuit (not shown), and demodulated subsequently.

FIG. 2 shows an equivalent circuit of the light-receiving element 1, in which the light-receiving element 1 is expressed as a parallel connection circuit of a current source I generating a current i proportional to the intensity of the incident light and a capacitance between the anode and cathode electrodes. The value of the capacitance C is determined by factors such as the reverse bias voltage, and the area of the light-receiving element, and generally is around 20 pF (picofarad).

In order to know the frequency characteristic of the photoelectric converting circuit by using this equivalent circuit, a transfer function $F_1$ of the photoelectric converting circuit shown in FIG. 1 is determined as follows. Since the capacitance C between the electrodes mentioned before and the resistance $R_1$ are connected in parallel with respect to the current source I, the transfer function $F_1(s)$ is expressed by the following expression.

$$F_1(s) = (e_1/i)$$
$$= R_1 \times (1/(1 + sCR_1))$$
where $s = j\omega$.

As shown by the above equation, this circuit forms a first-order lag circuit with a cut-off frequency $fc_1$ which is equal to $\frac{1}{2}\pi CR_1$. Assume $R_1 = 10K\Omega$, $C = 20$ pF, then $fc_1$ will have a value around 800 KHz ($fc_1 \cong 800$ KHz). As a result, frequency components above this frequency are attenuated. If the resistance $R_1$ is increased above $10K\Omega$ in order to raise the gain of the circuit, the cut-off frequency will go down to become lower than 800 KHz.

Another example is illustrated in FIG. 3. In the arrangement shown in this figure, the output signal of the light-receiving element 1 is supplied to a negative feedback amplifier made up of an inverting dc (direct current) amplifier 2 and a feedback resistor $R_2$. An output voltage signal $e_2$ of the feedback amplifier is fed back to an input thereof at a rate of 100%, so that the voltage level at the input terminal thereof is maintained constant. This voltage at the input terminal serves as the reverse bias voltage of the light-receiving element 1. As the inverting dc amplifier 2, an invertor IC of CMOS (complementary MOS) structure may be used. This negative feedback amplifier constitutes a current-voltage converting circuit, and the output current of the light-receiving element 1 is converted to a voltage by means of the resistance $R_2$ and outputted subsequently.

The equivalent circuit of this circuit is illustrated in FIG. 4. If the gain of the inverting dc amplifier 2 is denoted by K and the light-receiving element is represented by the current source I and the capacitance C, then the transfer function $F_2(s)$ thereof is expressed as follows.

$$F_2(s) = (e_2/i)$$
$$= R_2 \times (K/(K + 1)) \times 1/(1 + S(CR_2/(K + 1)))$$

Thus this photoelectric converting circuit forms a first-order lag circuit having a cut-off frequency $f_2$ which is equal to $(K+1)/(2\pi CR_2)$. If it is assumed that $R_2 = 10K\Omega$, $K = 10$, and $C = 20$ pF, the cut-off frequency $fc_2$ is approximately at 8.8 MHz. As a matter of practice, since an input capacitance of the inverting dc amplifier 2 is added to the capacitance C of the light receiving element 1, the cut-off frequency becomes to be lower than $fc_2$.

On the other hand, in magneto-optical disc systems whose developement has been progressing in recent years, a light beam is irradiated on the information recording track of the magneto-optical disc and the read-out of signal is performed by utilizing a small rotation of the plane of polarization in a light reflected by the magneto-optical disc or transmitted through it.

In the case of those magneto-optical disc systems, the RF signal level obtained from the light receiving element such as the element 1 is weak, so that thermal noises generated by the resistance $R_1$ or $R_2$ cause a problem in the signal retrieval. Also, it is known that the voltage level of the thermal noise is proportional to the square root of the resistance value. On the other hand, the voltage level of the output signal of the photoelectric converting circuit is proportional to the above resistance value. Therefore, it is desirable to determine the values of the first and second resistances as high as possible in order to raise signal-to-noise ratio (S/N).

However, as mentioned before, if the resistance value is made higher, the cut-off frequency goes down. As a result, it becomes difficult to obtain the required band width. Furthermore, when the RF current signal is weak, there can be another problem of inducing noises.

Specifically, there is a tendency that the higher the resistance value of the load resistance $R_1$ or $R_2$ to be connected to the cathrode of the light receiving element 1, the larger the induction noises become. In the case of the photoelectric converting circuits described before, the resistance value of the resistance $R_1$ is equal to $10k\Omega$ in the circuit of FIG. 1, and the resistance value of $R_2/(K+1)$ is approximately $910\Omega$ in the circuit of FIG. 3. Hence, noises can be induced easily in both examples of the photoelectric converting circuits.

OBJECT AND SUMMARY OF THE INVENTION

An object of the present invention is therefore to provide a photoelectric converting circuit having a broad band characteristic and also having an excellent signal-to-noise ratio.

In order to attain the above object, a photoelectric converting circuit according to the prevent invention which has a light receiving element generating a current signal corresponding to the amount of incident light and a current-to-voltage converting circuit for converting the current signal to a voltage signal is devised to supply the current signal to the current-to-voltage converting circuit through an active circuit exhibiting a impedance.

DETAILED DESCRIPTION OF PREFERRED EMBODIMENTS

Figure 1:
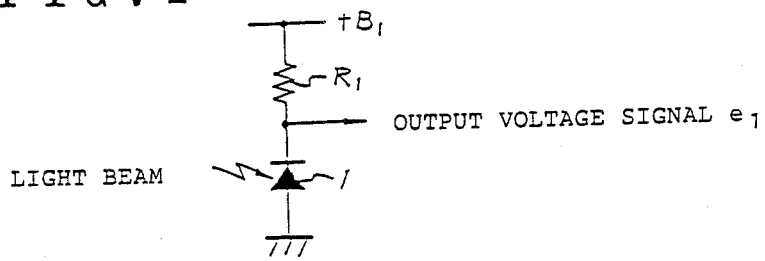
FIG. 1 is a circuit diagram showing an example of conventional photoelectric converting circuit.
Figure 2:
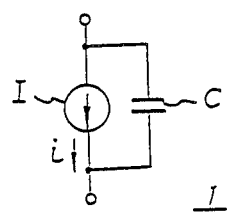
FIG. 2 is an equivalent circuit diagram for explaining a light-receiving element.
Figure 5:
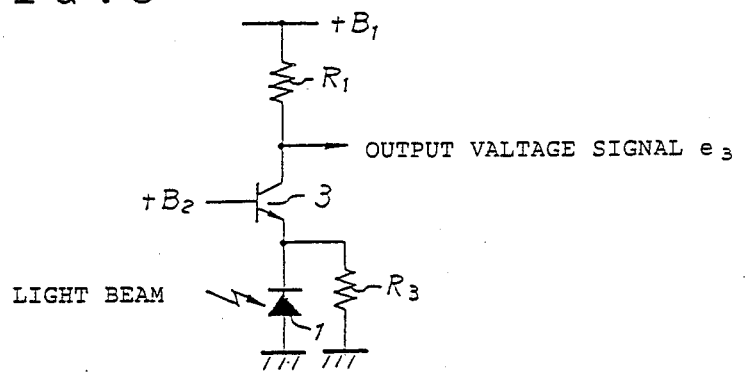
FIG. 5 is a circuit diagram showing an embodiment of a photoelectric converting circuit according to the present invention.

The first embodiment of the photoelectric converting circuit according to the present invention will be described with reference to FIG. 5. In FIGS. 1 and 5, like reference numerals are used to denote like elements or parts of th photoelectric converting circuit, and the explanation thereof will not be repeated.

As shown in FIG. 5, a common-base transistor circuit serving as the low input-impedance active circuit is inserted between the light receiving element 1 and the resistance $R_1$. A predetermined bias voltage $+B_2$ is applied to the base of the transistor 3 of the common-base transistor circuit, and its emitter and collector are connected to the cathode of the light-emitting element 1 and the resistance $R_1$ respectively. The base of the transistor described above is grounded with respect to ac currents through a power supply circuit (not shown). In the event that an average output current of the light-receiving element 1 is not sufficient as the bias current of the transistor 3, a bias resistance $R_3$ is connected in parallel to the light-receiving element 1, so that the bias current is supplied to the emitter described above. The remaining portions of this photoelectric converting circuit are identical with the corresponding portions of the circuit shown in FIG. 1.

In the construction described above, a parallel circuit of the resistance Re between the base and emitter of the transistor 3, the bias resistor $R_3$, and the capacitance C of the light-receiving element 1 constitutes the load of the current source I of the light-receiving element 1.

It is known that the value of the resistance Re is given by the equation of $Re \approx 25/Ie\Omega$ at the normal temperature, where Ie represents the emitter bias current in milliamperes (mA). If the emitter bias current Ie is chosen to be equal to 0.1 mA, then the value of the resistance Re becomes equal to $250\Omega$.

Since the value of the bias resistance $R_3$ is sufficiently higher than the value of the resistance Re, a combined resistance of the resistance Re and the bias resistance $R_3$ can be regarded to be approximately equal to the value of the resistance Re. Hence, a parallel circuit of the resistance Re and the capacitor C forms the load on the current source I. The cut-off frequency $fc_3$ of the output current i of the light-receiving element 1 under this condition is approximately 32 MHz, assuming that $Re=250\Omega$ and $C=20$ pF. Since the emitter current and the collector current of the transistor 3 is approximately equal to each other, the cut-off frequency of the voltage output $e_3$ at the output terminal, that is, the output voltage obtained as the voltage drop across the resistance $R_1$ is also approximately 32 MHz. Furthermore, a base-collector capacaitance $C_{BC}$ having a value around 0.4 pF exists in the transistor 3, and such a capacitance $C_{BC}$ together with the resistance R1 forms a parallel circuit which is operative to deteriorate the high frequency characteristic of the collector output. If $R_1=10k\Omega$, $C_{BC}=0.4$ pF, the cut-off frequency is 40 MHz. Therefore, the base-collector capacitance of the transistor 3 lowers the above mentioned cut-off frequency $fc_3$ only by a small amount, and the cut-off frequency $fc_3$ of the photoelectric circuit is secured to be at least above 20 MHz.

Thus, the cut-off frequency of the circuit, which was approximately 800 KHz in the circuit shown in FIG. 1, is improved to have a value above 20 MHz by the employment of the circuit construction shown in FIG. 5 according to the present invention.

On the other hand, the practical load resistance of the light receiving element is approximately $250\Omega$, which is sufficiently smaller than the value $10K\Omega$ of the load resistance $R_1$ of the circuit shown in FIG. 1. Thus, there is an advantage that the aforementioned induction of noises by the electromagnetic waves is reduced.

The second embodiment of the photoelectric converting circuit according to the present invention will be described with reference to FIG. 6. In this embodiment shown in FIG. 6, a negative-feedback amplifier is used to replace the load resistance $R_1$ serving as the current-to-voltage converting device shown in FIG. 5. The remaining portions of this photoelectric converting circuit are the same as the corresponding portions of the circuit shown in FIG. 5.

Figure 3:
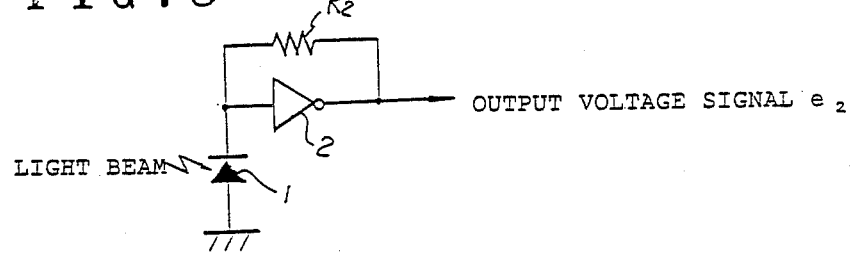
FIG. 3 is a circuit diagram showing another example of conventional photoelectric converting circuit.
Figure 4:
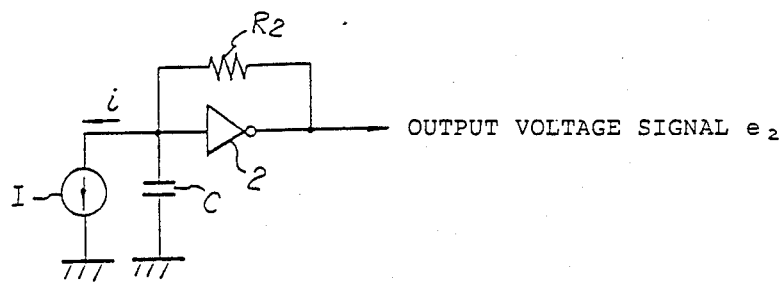
FIG. 4 is an equivalent circuit diagram for explaining the circuit shown in FIG. 3.

In the construction of this circuit, the load resistance of the light receiving element 1 becomes approximately equal to the resistance Re ($250\Omega$ for example) between the base and emitter of the transistor 3 as mentioned before. Thus, the load resistance of this circuit becomes sufficiently lower than the load resistance ($910\Omega$ for example) of the circuit shown in FIG. 3.

On the other hand, capacitive load on the collector output signal of the transistor 3 is approximately equal to the input capacitance of the inverting dc amplifier 2 only. Generally, the input capacity has a value around several picofarads (pF). Therefore, the cut-off frequency $fc_4$ in this embodiment is higher than the cut-off frequency $fc_2$ (aaproximately 8.8 MHz) of the circuit construction shown in FIG. 3.

Figure 6:
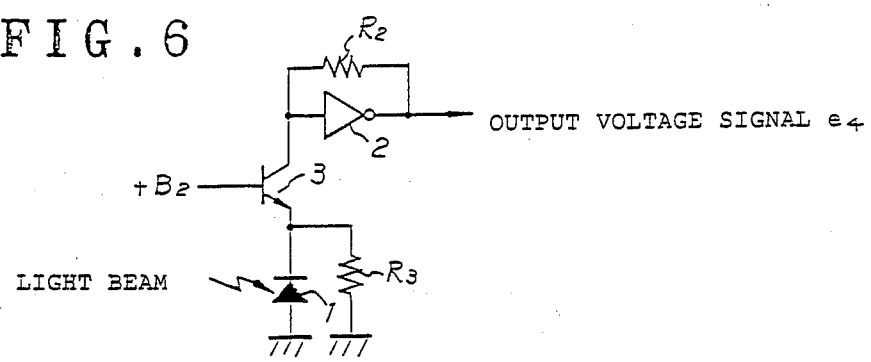
FIG. 6 is a circuit diagram showing another embodiment of the photoelectric converting circuit according to the present invention.

Thus, the second embodiment shown in FIG. 6 has an advantage over the circuit construction shown in FIG. 5 in that the cut-off frequency $fc_4$ is further shifted on the high frequency side. Moreover, the value of the load resistance in the second embodiment is smaller, and the influence by the induction noises is reduced accordingly.

Although a common-base transistor circuit is utilized in the described embodiments, it is also possible to employ an active circuit exhibiting a low input impedance which uses an FET, a vacuum tube, or an IC instead of the common-base transistor circuit. The present invention has been explained by way of an example in which a low level modulation signal such as the reflection light beam in magneto-optical disc systems is converted to an electric signal. However, it should be noted that the present invention is applicable to the pickup of optical disc playing systems such as the video disc player or CD players, or the photo sensor used in devices such as a tachometer.

If the broad-band characteristic is not required so much, the load resistance can be increased. In such a case, the gain of current-to-voltage conversion is increased, so that the gain of the amplification circuit in the later stage can be reduced in that proportion. Thus, it can contribute in cutting-down the cost of the circuit.

As described in the foregoing, the photoelectric converting circuit according to the present invention is constructed to supply the output current of the light-receiving element to the current-to-voltage converting circuit through an active circuit exhibiting a low input impedance. Therefore, it is advantageous in that the load resistance of the ligh-receiving element is reduced, so that the band width of the frequency characteristic of the circuit is broadened, while the resistance for the current-to-voltage conversion is increased as high as possible, so that the level of the output voltage signal is raised and the SN ratio of the output voltage signal is improved.

What is claimed is:

1. A photoelectric converting circuit comprising:
   a light receiving element for receiving incident light and producing a current signal corresponding to the amount of incident light, said light receiving element having an internal capacitance;
   current-to-voltage converting means for converting said current signal produced by said light receiving element into a voltage signal at an output terminal, said voltage signal having a cut-off frequency at which its magnitude is substantially reduced;
   an active circuit component connected between said light receiving element and said current-to-voltage converting means for receiving said current signal produced by said light receiving element and supplying a current to said current-to-voltage converting means, said active circuit having an internal resistance and a low input impedance as seen by said light receiving element;
   bias resistance connected to said active circuit means;
   the parallel combination of said internal capacitance of said light receiving element, said internal resistance of said active circuit and said bias resistance forming a load resistance of the current signal of said light receiving element, said internal resistance being substantially smaller than said bias resistance so that said load resistance is substantially the value of said bias resistance thus increasing the value of said cut-off frequency to expand the bandwidth of said photoelectric converting circuit.

2. The photoelectric converting circuit of claim 1, wherein said current-to-voltage converting means comprises a resistance having a value substantially larger than said load resistance so that induction of noise in said voltage signal is decreased.

3. The photoelectric converting circuit of claim 1, wherein said current-to-voltage converting means comprises a negative-feedback amplifier having an effective resistance substantially larger than said load resistance so that induction of noise in said voltage signal is decreased.

4. The photoelectric converting circuit of claim 1, wherein said active circuit component comprises a common-base transistor with the emitter of said transistor connected to said light receiving element and to said bias resistance, and the collector connected to said current-to-voltage converting means so that the current carried by said collector corresponds to the current supplied to said current-to-voltage converting means, said internal resistance corresponds to the resistance between the base and emitter of said transistor.

5. The photoelectric converting circuit of claim 4, wherein said current-to-voltage converting means comprises a resistance, and said voltage signal is created by the product of the current carried by said collector and said resistance.

* * * * *